(12) United States Patent
Han et al.

(10) Patent No.: US 7,499,233 B1
(45) Date of Patent: Mar. 3, 2009

(54) MULTI-PHASE CONTROL INFORMATION DETECTION AND SIGNAL POLARITY DETERMINATION

(75) Inventors: Ke Han, Fremont, CA (US); Zining Wu, Los Altos, CA (US)

(73) Assignee: Marvell International Ltd., Hamilton (BM)

( * ) Notice: Subject to any disclaimer, the term of this patent is extended or adjusted under 35 U.S.C. 154(b) by 314 days.

(21) Appl. No.: 10/949,533

(22) Filed: Sep. 24, 2004

Related U.S. Application Data

(60) Provisional application No. 60/654,126, filed on Apr. 20, 2004.

(51) Int. Cl.
G11B 5/035 (2006.01)
(52) U.S. Cl. .......................................... 360/65; 360/39
(58) Field of Classification Search ........................ None
See application file for complete search history.

(56) References Cited

U.S. PATENT DOCUMENTS

| | | | | |
|---|---|---|---|---|
| 4,970,609 A | * | 11/1990 | Cunningham et al. | 360/51 |
| 5,341,387 A | * | 8/1994 | Nguyen | 714/788 |
| 5,542,305 A | * | 8/1996 | Hollinger | 73/863.73 |
| 5,661,760 A | * | 8/1997 | Patapoutian et al. | 375/341 |
| 5,668,678 A | | 9/1997 | Reed et al. | |
| 5,757,576 A | * | 5/1998 | Kosugi | 360/78.14 |
| 5,844,741 A | * | 12/1998 | Yamakawa et al. | 360/65 |
| 5,907,586 A | * | 5/1999 | Katsuragawa et al. | 375/341 |
| 5,963,387 A | | 10/1999 | Son | |
| 6,009,549 A | * | 12/1999 | Bliss et al. | 714/769 |
| 6,067,198 A | * | 5/2000 | Zuffada et al. | 360/46 |
| 6,108,151 A | * | 8/2000 | Tuttle et al. | 360/51 |
| 6,115,198 A | * | 9/2000 | Reed et al. | 360/46 |
| 6,144,513 A | * | 11/2000 | Reed et al. | 360/51 |
| 6,148,043 A | * | 11/2000 | Fujimoto | 375/341 |
| 6,185,716 B1 | * | 2/2001 | Riggle | 714/769 |
| 6,378,107 B1 | * | 4/2002 | Yoshinaka | 714/795 |
| 6,493,162 B1 | * | 12/2002 | Fredrickson | 360/51 |
| 6,532,122 B1 | * | 3/2003 | Sugawara et al. | 360/46 |
| 6,532,567 B2 | * | 3/2003 | Ino | 714/798 |
| 6,603,622 B1 | * | 8/2003 | Christiansen et al. | 360/66 |
| 6,639,748 B1 | * | 10/2003 | Christiansen et al. | 360/66 |
| 6,680,807 B1 | * | 1/2004 | She et al. | 360/51 |
| 6,724,555 B2 | * | 4/2004 | Ohta | 360/65 |
| 6,813,108 B2 | * | 11/2004 | Annampedu et al. | 360/51 |
| 6,856,480 B2 | * | 2/2005 | Kuki et al. | 360/49 |
| 6,912,099 B2 | * | 6/2005 | Annampedu et al. | 360/39 |
| 7,082,005 B2 | * | 7/2006 | Annampedu et al. | 360/51 |

(Continued)

OTHER PUBLICATIONS

U.S. Appl. No. 10/799,474, "Disk Servo Pattern Writing", filed Mar. 11, 2004.

*Primary Examiner*—Hoa T Nguyen
*Assistant Examiner*—Dismery E Mercedes

(57) ABSTRACT

Interpreting signals on a noisy channel with polarity uncertainty. A signal processor, such as a read channel transceiver device usable in a magnetic recording system, includes a first detector (e.g., a Viterbi detector) responsive to a readback signal and operable to examine the readback signal at alternative framings based on possible signal polarities of the readback signal, and a second detector (e.g., a servo field detector) responsive to an output of the first detector and operable to find a data pattern that indicates control information (e.g., a servo address mark) in the readback signal and to determine a signal polarity of the readback signal by comparing signal quality information corresponding to the possible signal polarities of the readback signal.

48 Claims, 3 Drawing Sheets

U.S. PATENT DOCUMENTS

| | | | |
|---|---|---|---|
| 2002/0114100 A1* | 8/2002 | Reed et al. | 360/77.07 |
| 2003/0030929 A1* | 2/2003 | Ozdemir | 360/46 |
| 2003/0055572 A1* | 3/2003 | Kuki et al. | 702/26 |
| 2003/0095350 A1* | 5/2003 | Annampedu et al. | 360/39 |
| 2003/0151838 A1* | 8/2003 | Sawaguchi et al. | 360/46 |
| 2004/0190646 A1* | 9/2004 | Aziz | 375/319 |
| 2005/0068650 A1* | 3/2005 | Annampedu et al. | 360/39 |
| 2006/0023603 A1* | 2/2006 | Annampedu et al. | 369/59.22 |

* cited by examiner

MULTI-PHASE CONTROL INFORMATION DETECTION AND SIGNAL POLARITY DETERMINATION

CROSS REFERENCE TO RELATED APPLICATIONS

This application claims the benefit of the priority of U.S. Provisional Application Ser. No. 60/564,126, filed Apr. 20, 2004 and entitled "Dual-Phase Viterbi Detector for SIM/SAM Detection with Polarity Uncertainty"; and this application is related to U.S. application Ser. No. 10/799,474, filed May 11, 2004 and entitled "Disk Servo Pattern Writing", which is hereby incorporated by reference.

TECHNICAL FIELD

The present disclosure describes systems and techniques relating to signal processing, for example, interpreting readback signals obtained from a magnetic storage medium to find a servo address mark (SAM).

BACKGROUND

Signal processing circuits are frequently used to read storage media and interpret obtained analog signals as discrete values stored on the media. For magnetic storage media, a transducer head may fly on a cushion of air over a magnetic disk surface. The transducer converts magnetic field variations into an analog electrical signal. The analog signal is amplified, converted to a digital signal and interpreted (e.g., using maximum likelihood techniques, such as using a Viterbi detector). Tracking of stored data during a read operation is frequently performed using feedback or decision aided gain and timing control. Moreover, a closed-loop servo system, driven by servo information embedded in a dedicated portion of every track of the recording surface, is used to accurately position the head and follow the track.

The servo control information defines the position of the data tracks. Typically, the servo control information is written on each surface as a radially extending set of spokes or wedges. The servo information typically includes a servo index mark (SIM) used as a reference point for counting sectors in a track. The servo information also typically includes, in a servo wedge at a track, a preamble used for timing recovery and data framing, a servo address mark (SAM) used for detecting the beginning of a valid servo field, and a track number code associated with the current track (and current wedge). The servo control information can also include two or more fine-positioned offset bursts configured in an echelon across the track.

SUMMARY

The present disclosure includes systems and techniques relating to interpreting signals on a noisy channel with polarity uncertainty. According to an aspect of the described systems and techniques, a signal processor, such as a read channel transceiver device usable in a magnetic recording system, includes a first detector (e.g., a Viterbi detector) responsive to a readback signal and operable to examine the readback signal at alternative framings based on possible signal polarities of the readback signal. The signal processor also includes a second detector (e.g., a servo field detector) responsive to an output of the first detector and operable to find a data pattern that indicates control information (e.g., SAM) in the readback signal and to determine a signal polarity of the readback signal by comparing signal quality information (e.g., path metrics) corresponding to the possible signal polarities of the readback signal.

The first detector can be a discrete time sequence detector operable to examine the readback signal from an equalized channel (e.g., a magnetic storage medium) according to a first framing indicated by the readback signal and a second framing opposite the first framing. The second detector can perform operations including identifying the data pattern in one or both of the first and second framings of the readback signal, and confirming the data pattern as found and the signal polarity based on the signal quality information from the discrete time sequence detector for the first and second framings.

The described systems and techniques can result in accurate detection of SAM and SIM when there is polarity uncertainty in the readback signal. The polarity of the readback signal waveform may be unknown at the time when SAM or SIM need to be found. For example, a new read operation can require a new stimulating current for the read head, which can impart a random polarity to the readback signal in a disk drive. The described systems and techniques can tolerate this polarity uncertainty, find SIM and SAM at the proper locations, and determine the signal polarity of the readback signal.

Details of one or more implementations are set forth in the accompanying drawings and the description below. Other features, objects and advantages may be apparent from the description and drawings, and from the claims.

DRAWING DESCRIPTIONS

DETAILED DESCRIPTION

Figure 1:
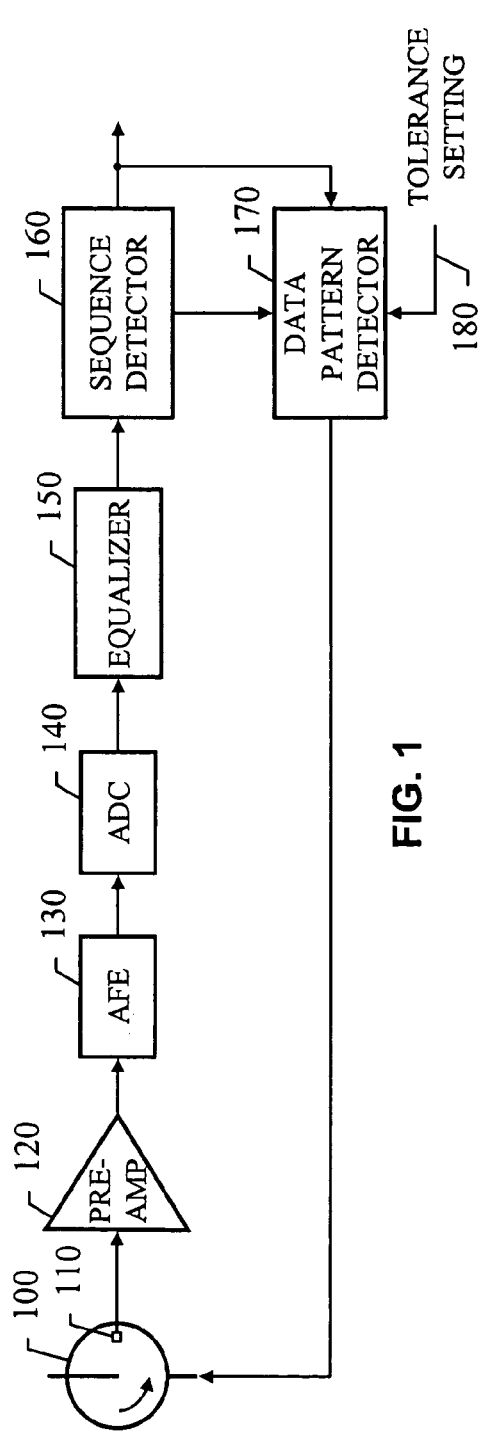
FIG. 1 is a block diagram showing a read channel in a storage system that employs multi-phase control information detection and signal polarity determination.

FIG. 1 is a block diagram showing a read channel in a storage system that employs multi-phase control information detection and signal polarity determination. The storage system includes a storage medium 100 and read head 110. The storage medium can be read-only or read/write media and can be magnetic-based, optical-based, semiconductor-based media, or a combination of these. Examples of the storage medium include hard disk platters in a hard disk drive, a floppy disk, a tape, and an optical disk (e.g., laser disk, compact disk, digital versatile disk). The storage medium is depicted in FIG. 1 as a disk for illustration only; the systems and techniques described herein can be used with other storage media types or in non-storage applications (e.g., communications equipment).

The read head 110 can be part of a read-write head assembly that reads the storage media 100 under the control of a servo or actuator. An analog readback signal is generated and can be sent to a pre-amplifier 120. The system can include an analog front end (AFE) 130, which can provide filtering and gain control. The AFE 130 can receive inputs from both a direct current (DC) control unit (e.g., DC offset cancellation)

and an automatic gain control (AGC) unit. The AFE 130 can include a variable-gain amplifier (VGA), which can be regulated by the AGC, and an analog equalizer, such as a continuous time filter (CTF).

An analog to digital converter (ADC) 140 converts the readback signal, and a signal equalizer 150 shapes the signal to a desired target response. The ADC 140 can be a 6-bit ADC. The signal equalizer 150 can be a finite impulse response (FIR) digital filter, such as a 9-tap or 10-tap FIR, which can be programmable or adaptive.

A sequence detector 160 can be a discrete time sequence detector that examines and interprets its input as discrete values stored on the media 100. Timing control circuitry, such as a timing control unit and/or a phase locked loop (PLL), can be used to regulate the readback signal provided to the detector 160, and DC correction can be applied at one or more locations in the main read path. The sequence detector 160 can be a Viterbi detector. The main read path can combine partial-response equalization with maximum-likelihood sequence detection (PRML) using a discrete-time approach (e.g., the class-IV partial response target (PR-IV)).

Additionally, the output of the sequence detector 160 is provided to a data pattern detector 170. The sequence detector 160 is operable to examine the readback signal at alternative framings based on possible signal polarities of the readback signal, and the data pattern detector 170 is operable to find a data pattern that indicates control information in the readback signal and to determine a signal polarity of the readback signal by comparing signal quality information corresponding to the possible signal polarities of the readback signal.

The data pattern detector 170 can include an input 180 that provides a programmable symbol error tolerance setting (e.g., one symbol error may be tolerated during identification of the data pattern in the readback signal). The data pattern to be found can be a servo mark, such as a servo address mark (SAM) or a servo index mark (SIM). The data pattern detector 170 can be part of a servo controller and/or part of a read/write channel circuit. A detailed example of multi-phase control information detection and signal polarity determination is now described in connection with FIGS. 2-4.

Figure 2:
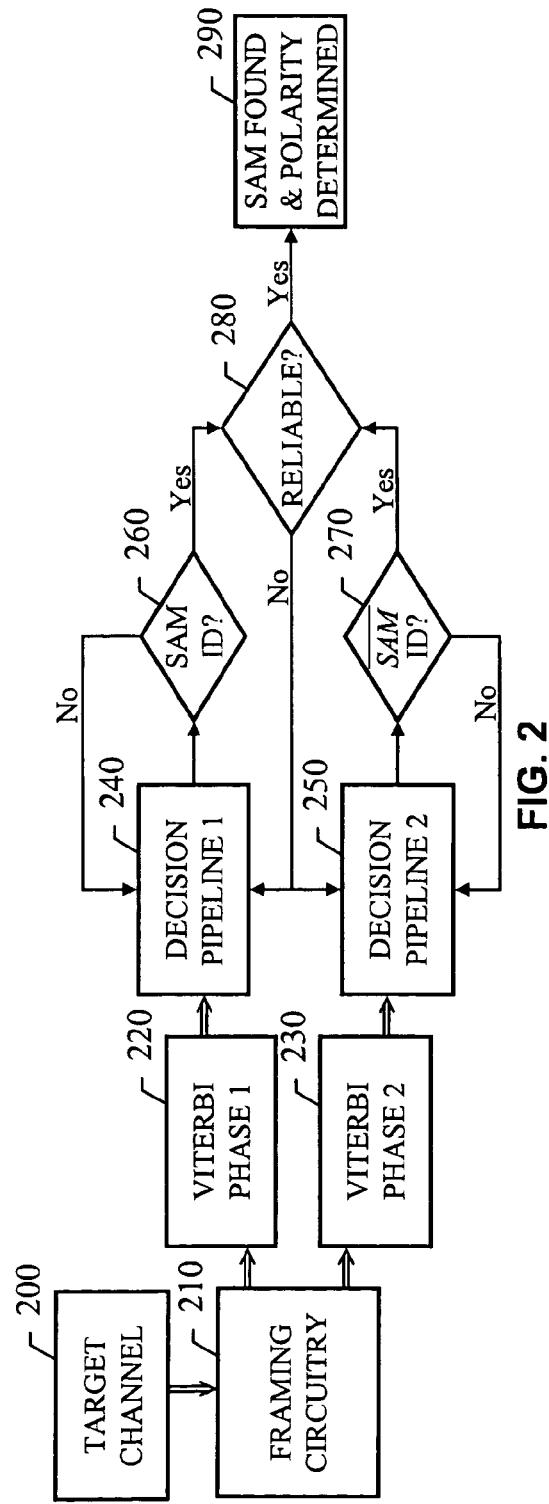
FIG. 2 illustrates dual-phase Viterbi SAM detection with polarity uncertainty.

FIG. 2 illustrates dual-phase Viterbi SAM detection with polarity uncertainty. A readback signal is obtained from an equalized channel 200 and provided to framing circuitry 210. The readback signal has an initially unknown polarity. The framing circuitry 210 can generate first and second framings (phases 1 and 2) of the readback signal for sequence detection, where one of the framings is indicated by the readback signal itself, and the other framing is the opposite of the signal indicated framing. For example, the signal indicated framing can be based on a generally sinusoidal portion of the readback waveform, and the opposite framing can be 180 degrees out of phase from the first framing in the readback waveform.

Figure 3:
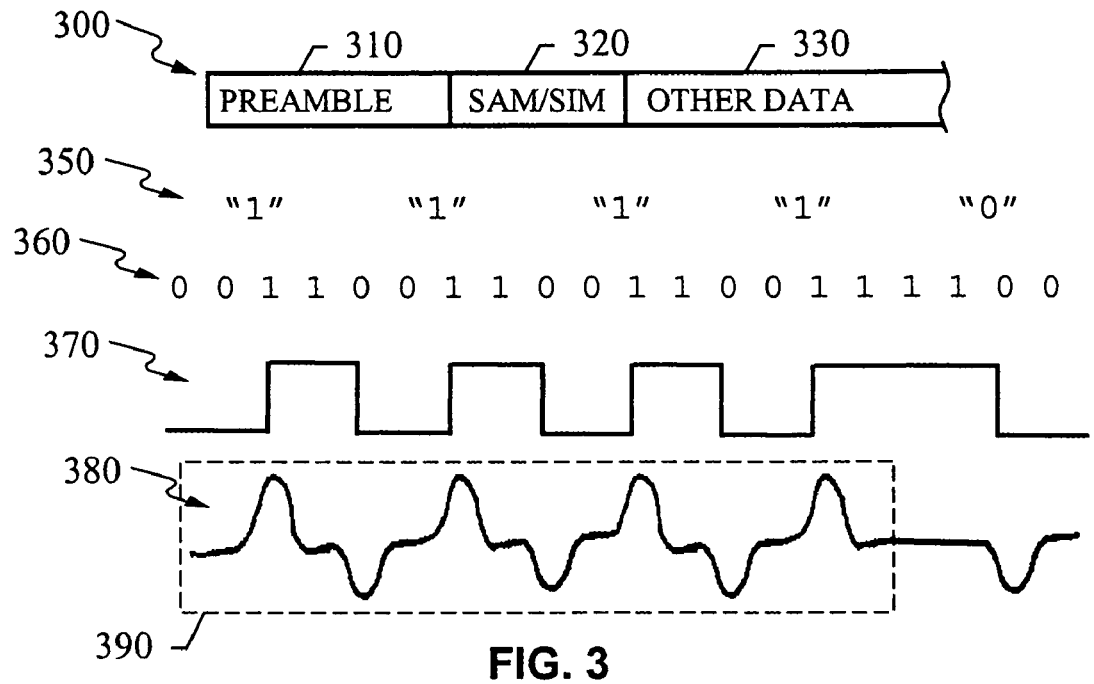
FIG. 3 illustrates the contents of a portion of a track of a recording surface.

FIG. 3 illustrates the contents of a portion 300 of a track of a recording surface. The track portion 300 includes a preamble 310, a SAM/SIM 320, and other data 330, which can include Gray coded data. The preamble 310 is a symbol sequence that can be used for timing recovery and data framing. The preamble 310 can be a sequence of "1" symbols, and the SAM/SIM 320 can be a selected pattern of "0" and "1" symbols (e.g., nine symbols, such as the symbol sequence 000100101). Only SAM will be discussed below, but the systems and techniques described are applicable to SIM and other control information data patterns as well. The other data 330 can include many different patterns of data describing different types of information (e.g., the index of a particular track), but can generally be thought of as a random set of "0" and "1" symbols for the purposes of this description.

The symbols in the track portion 300 can be coded using a rate ¼ Manchester coding in the equalized channel. For example, the symbols can be coded according to the following rules: a "1" symbol is mapped to "0011", and a "0" symbol is mapped to "1100". Thus, there is only one bit of information for every four channel bits. To reliably detect the underlying symbols from a sampled sequence, the sampled sequence should be correctly framed into groups of four samples so that each group of four samples is truly correlated to one particular symbol.

A symbol sequence 350 shows an example of a tail end of the preamble 310 (the last four "1" symbols of the preamble) and the beginning of the SAM 320 (the first "0" symbol of the SAM). A corresponding rate ¼ encoded sequence of channel bits 360 is shown just below the symbol sequence 350. A digital waveform 370 illustrates the positive and negative transitions used in writing the encoded sequence 360 to a storage medium. An analog waveform 380 illustrates the corresponding signal obtained by reading the track. As shown, a positive transition in the binary waveform results in a positive pulse in the readback signal, and a negative transition in the binary waveform results in a negative pulse in the readback signal. The zero symbol may thus be indicated in the readback signal by a longer than usual distance between two adjacent signal peaks.

As shown, the preamble 310 generates a generally sinusoidal waveform 390, which can be used to frame the sampled sequence. The bit pattern of the preamble is the following sequence: [0, 0, 1, 1, 0, 0, 1, 1, 0, 0, 1, 1, . . . , 0, 0, 1, 1]. If the target is [1, 0, −2, 0, 1], then the sampled preamble waveform is given by [x, x, x, x, −2, −2, +2, +2, −2, −2, +2, +2, . . . , −2, −2, +2, +2] and the framing of the preamble samples is [x, x, x, x|−2, −2, +2, +2|−2, −2, +2, +2| . . . |−2, −2, +2, +2]. Viterbi detection of the SAM can be performed based on this signal-indicated framing.

The polarity uncertainty is not seen in the preamble waveform 390 because a flipped sin wave is still a sin wave. With a reversed polarity, if the framing is still decided by the preamble samples in the manner described above, the framing would be off by two channel bits or two channel clock cycles. The correct framing in this case can be derived by shifting the above framing (decided by the preamble samples) by two bits. Then dual-phase Viterbi detection can be performed for the SAM 320 at two opposite phases: one decided by preamble samples and the other being two channel clock cycles apart from the first framing. Whatever the polarity may be, one of the two phases catches the correct framing.

If the polarity is positive as assumed, the first phase processing (decided by the preamble) detects SAM correctly, while the second phase processing (first phase shifted by two channel bits) generally yields unreliable results. If the polarity is negative and the framing is opposite to what is assumed based on the preamble, then the second phase processing reliably detects the reversed version of SAM (with every symbol flipped), while the first phase processing generally yields unreliable results.

This dual-phase processing is illustrated in FIG. 2. The framing circuitry 210 provides first and second framings of the samples (phases 1 and 2) to first and second phase Viterbi detector(s) 220, 230 for sequence detection. The first and second phase Viterbi detector(s) 220, 230 provide decisions of symbols to first and second decision pipelines 240, 250 (e.g., shift registers). The dual-phase processing illustrated in FIG. 2 can be performed in parallel (e.g., two separate Viterbi detectors operating on the two framings) or in sequence (e.g., multiplexing detection in a single Viterbi detector between the two framings to generate two output streams).

The decision pipelines 240, 250 provide vectors for comparison with the SAM pattern. In the upper branch shown in FIG. 2, the polarity is assumed to be positive. An output vector of decision pipeline 240 is compared with the SAM pattern at 260. A programmable number of symbol errors can be tolerated in this comparison. If the SAM is identified in phase 1 data, a check is made to confirm that the identified SAM is reliable at 280. This is done using signal quality information for the first and second framings.

In the lower branch shown in FIG. 2, the polarity is assumed to be negative. An output vector of decision pipeline 250 is thus compared with the inverse SAM pattern at 270. A programmable number of symbol errors can be tolerated in this comparison. If the inverse SAM is identified in phase 2 data, a check is made to confirm that the identified SAM is reliable at 280. This is done using signal quality information (e.g., path metric information) for the first and second framings.

The wrong framing can occasionally assert that SAM is found before the correct framing does. Path metric information from the Viterbi detector(s) is used to decide which phase is more reliable and confirm that SAM has been found. Smaller path metrics indicate a more reliable decision sequence because the wrong framing produces invalid sample patterns for transitions between a "1" symbol and a "0" symbol. Thus, the path metrics for the wrong framing are generally much larger than those for the correct framing. Even with noise in the channel, the path metrics from the two phases can be a reliable indicator as to which phase should be trusted.

Thus, if SAM is identified in phase 1 data, but the path metric for phase 1 is greater than the path metric for phase 2, then SAM is determined to be not found yet, and checking of the output vectors of decision pipelines 240, 250 continues. If SAM is identified in phase 1 data, and the path metric for phase 1 is less than or equal to the path metric for phase 2, then the found SAM and the determined polarity are confirmed at 290 (since SAM was found in phase 1 data, the polarity is positive).

Likewise, if the inverse SAM is identified in phase 2 data, but the path metric for phase 2 is greater than the path metric for phase 1, then SAM is determined to be not found yet, and checking of the output vectors of decision pipelines 240, 250 continues. If inverse SAM is identified in phase 2 data, and the path metric for phase 2 is less than or equal to the path metric for phase 1, then the found SAM and the determined polarity are confirmed at 290 (since SAM was found in phase 2 data, the polarity is negative). In the unlikely event that both branches find SAM and the minimum path metrics for the two branches are equal, normal (positive) polarity can be assumed.

The path metrics discussed above for phases 1 and 2 are the minimum values of the oldest survivor paths in the respective branches. In this example, a two state Viterbi detector is being used for a phase processing branch; thus, there are two survivor paths to compare for the branch, and the minimum path metric from these two survivor paths is used in the reliability check.

Figure 4:
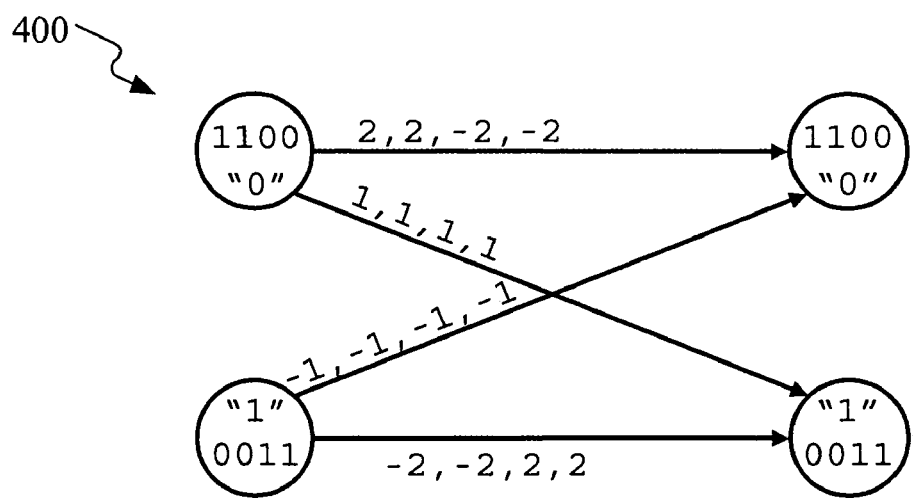
FIG. 4 illustrates an example trellis used during processing of a readback signal.

Because there is Manchester encoding involved, the Viterbi detector uses a group of samples to recover one symbol. For this type of encoding, the Viterbi detector is based on a trellis. FIG. 4 illustrates an example trellis 400 used during processing of a readback signal. The nodes of the trellis 400 are labeled with the symbols and their corresponding channel bits, where the nodes on the left represent decision states being transitioned from, and the nodes on the right represent decision states being transitioned to.

The Viterbi detector takes four channel samples and calculates the branch metrics for connections between pairs of states. The trellis 400 includes the described states and the predefined sample polarities that indicate a valid transition from one state to another (note that the trellis 400 is constructed assuming the polarity of the readback signal waveform is normal, or positive). As shown, there are four kinds of transitions from symbol to symbol, and each transition has a corresponding sampled output (i.e., the transition patterns shown between the old bit pattern on the left and the new bit pattern on the right). If the target polynomial is [1, 0, −2, 0, 1], then the trellis of the Viterbi detection can be based on the following transition output patterns:

"0"→"0" (i.e., "1100"→"1100"), out00=[2, 2, −2, −2];
"0"→"1" (i.e., "1100"→"0011"), out01=[1, 1, 1, 1];
"1"→"0" (i.e., "0011"→"1100"), out10=[−1, −1, −1, −];
"1"→"1" (i.e., "0011"→"0011"), out11=[−2, −2, 2, 2];

Viterbi detector operation can be logically divided into branch metric calculation and add/compare/select. A transition, or branch, in the trellis represents a possible change from state to state. For each of the states, a survivor path and a path metric can be updated and saved for each input symbol to the detector. With binary data detection, for each current state there are two immediate previous states that lead into the current state. The path metric of this current state can be updated according to the following equation: $pm_k^j = \min\{pm_{k-1}^m + bm_{m,j}, pm_{k-1}^n + bm_{n,j}\}$, where $pm_k^j$ is the path metric of the j-th state at time k; $pm_{k-1}^m$ and $pm_{k-1}^n$ are the path metrics at time k−1 of the m-th and n-th states, respectively, which lead into the j-th state; $bm_{X,j}$ is the metric of the branch that connects the X-th state (m or n) and the j-th state. Once the path metric for the j-th state is decided, its path memory can also be decided by inheriting the path memory of the one of the two previous states (m or n) that gives it the best path metric, and adding to this inherited path the most current one of the binary bits that constitute the current, j-th, state.

The operation of this dual-phase SAM detection is now described using the following Matlab script, where comment lines are begun with a "%":

% main loop, keeps searching if neither phase asserts sam_found.
while cntr<maxLen & sam_found(1) == 0 & sam_found(2) == 0,
    % check two opposite phases
    for i=1:2,
        % branch metric calculations:
        bm00=norm(out00-samples_n(j+(i−1)*2:j+(i−1)*2+
            3))^2;
        bm01=norm(out01-samples_n(j+(i−1)*2:j+(i−1)*2+
            3))^2;
        bm10=norm(out10-samples_n(j+(i−1)*2:j+(i−1)*2+
            3))^2;
        bm11=norm(out11-samples_n(j+(i−1)*2:j+(i−1)*2+
            3))^2;
        % add, compare and select:
        if (pm0_old(i)+bm00<pm1_old(i)+bm10),
            pm0_new(i)=pm0_old(i)+bm00;
            path0_new(i,1:end1)=[0 path0_old(i,1 :end1−1)];
        else
            pm0_new(i)=pm1_old(i)+bm10;
            path0_new(i,1:end1)=[0 path1_old(i,1 :end1−1)];
        end
        if(pm0_old(i)+bm01<pm1_old(i)+bm11),
            pm1_new(i)=pm0_old(i)+bm01;
            path1_new(i,1 :end1)=[1 path0_old(i,1 :end1−1)];
        else
            pm1_new(i)=pm1_old(i)+bm11;
            path1_new(i,1 :end1)=[1 path1_old(i,1 :end1−1)];
        end

```
% take the decision from the trellis at depth of 8.
    vit_out(I,cntr)=path0_old(i,8);
end
% update path metrics and path memories
path0_old=path0_new;
path1_old=path1_new;
pm0_old=pm0_new;
pm1_old=pm1_new;
% look for SAM at the first phase:
cmp=vit_out(1,cntr-8:cntr)-sam_symbols;
% tolerate up to 1 symbol error.
if sum(abs(cmp))<2,
    sam_found(1)=1;
    pol_d=1;
end
% look for flipped SAM at the second phase:
cmp=vit_out(2,cntr-8:cntr) - ~sam_symbols;
% tolerate up to 1 symbol error.
if sum(abs(cmp))<2,
    sam_found(2)=1;
    pol_d=-1;
end
% check the reliability of the SAM_found assertion
if sam_found(1) & min(pm0_old(1), pm1_old(1))>min
    (pm0_old(2),pm1_old(2)),
    sam_found(1)=0;
    pol_d=-1;
else
if sam_found(2) & min(pm0_old(1),pm1_old(1))<min
    (pm0_old(2),pm1_old(2)),
    sam_found(2)=0;
    pol_d=1;
else
if    sam_found(1)&sam_found(2)&(min(pm0_old(1),
    pm1_old(1))==min(pm0_old(2),pm1_old(2)),
    sam_found(2)=0;
    pol_d=1;
end
% advance the counters.
j=j+4;
cntr=cntr+1;
end
```

As described in the Matlab script above, the Viterbi detector compares many different combinations to determine the shortest path through the trellis, and then for each surviving state, the detector finds that shortest path and remembers only that path. The trellis grows until the input samples run out, and then the survivor path in memory is the decision for the output symbols.

The Viterbi detector can include a branch metric generator, an add-compare-select (ACS) component, a memory, and a traceback component. The branch metric generator calculates branch metrics as described, and supplies the results to the ACS component. The ACS component adds the branch metrics to any saved state metrics (i.e., retained path metrics) according to a trellis, which shows the progression of the decoding in time based on the inputs. The ACS component compares current path metrics and selects the paths in the trellis with the best path metrics. The selected paths and their path metrics can be saved in the memory (e.g., one or more random access memories, which may be integrated into the ACS component and/or the traceback component). The traceback component looks at the survivor paths to identify the path having the best correlation with the received data, and outputs decoded data accordingly.

The systems and techniques described above can be implemented in a storage device without major architectural changes and only minimal additional hardware. One or two sequence detectors can be used as described above; using two sequence detectors generally increases speed at the cost of more hardware. The data pattern detector can be integrated into the sequence detector(s). Moreover, the signal processor components described can be implemented as one or more devices, such as one or more integrated circuit (IC) devices, in a storage device (e.g., a magnetic-media disk drive).

Figure 5:
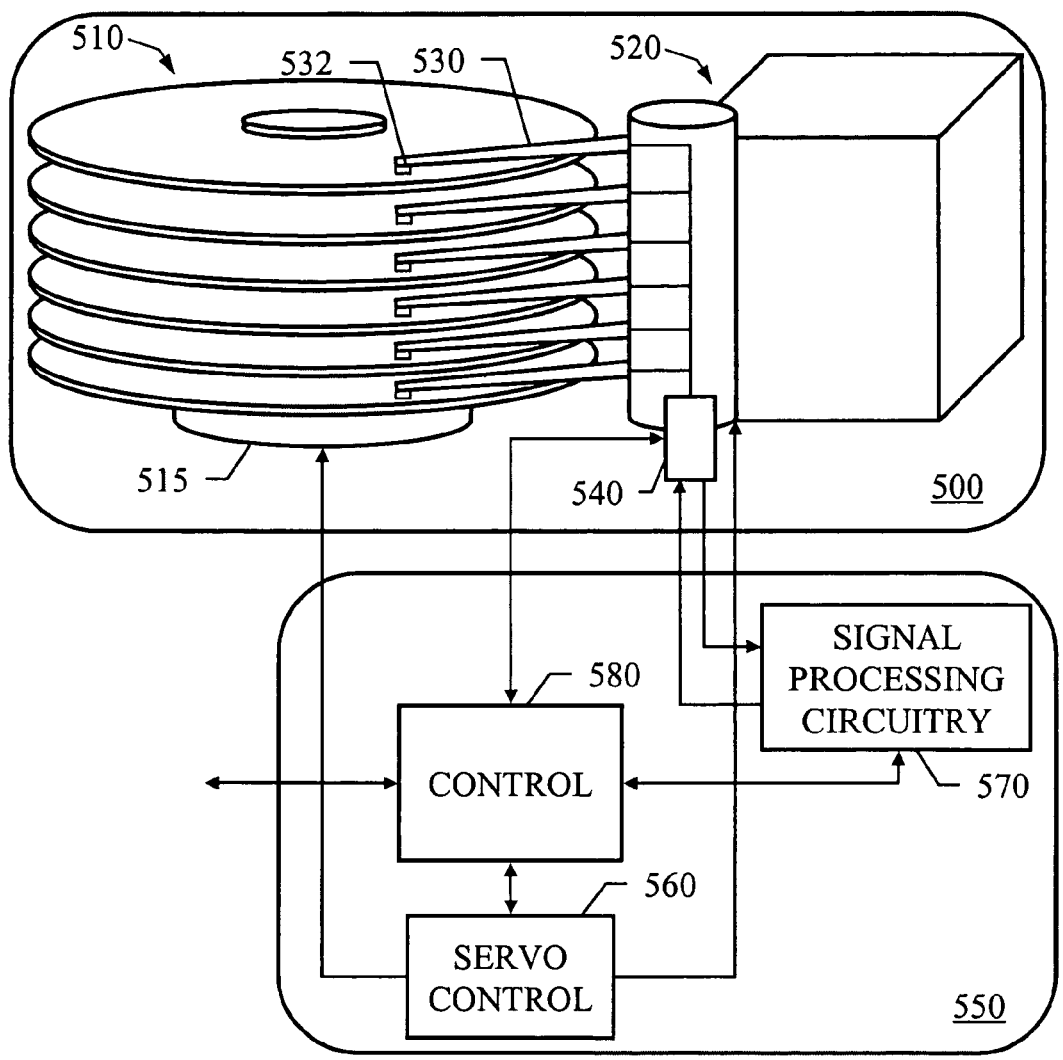
FIG. 5 is a block diagram showing a magnetic-media disk drive that employs multi-phase control information detection and signal polarity determination.

FIG. 5 is a block diagram showing a magnetic-media disk drive that employs multi-phase control information detection and signal polarity determination as described. The disk drive includes a head-disk assembly (HDA) 500 and drive electronics 550 (e.g., a printed circuit board (PCB) with semiconductor devices). The HDA 500 includes one or more disks 510 mounted on an integrated spindle and motor assembly 515. The spindle and motor assembly 515 rotates the disk(s) 510 under read-write head(s) connected with a head assembly 520 in the HDA 500. The disk(s) 510 can be coated with a magnetically hard material (e.g., a particulate surface or a thin-film surface) and can be written to, or read from, a single side or both sides of each disk.

A head 532 on an arm 530 can be positioned as needed to read data on the disk. A motor (e.g., a voice coil motor or a stepper motor) can be used to position the head over a desired track. The arm 530 can be a pivoting or sliding arm and can be spring-loaded to maintain a proper flying height for the head 532 in any drive orientation. A closed-loop head positioning system can be used.

The HDA 500 can include a read-write chip 540, where head selection and sense current value(s) can be set. The read-write chip 540 can amplify a readback signal before outputting it to signal processing circuitry 570. The signal processing circuitry 570 can include a readback signal circuit, a servo signal processing circuit, and a write signal circuit.

Signals between the HDA 500 and the drive electronics 550 can be carried through a flexible printed cable. A controller 580 can direct a servo controller 560 to control mechanical operations, such as head positioning through the head assembly 520 and rotational speed control through the motor assembly 515. The controller 580 can be one or more IC chips (e.g., a combo chip). The controller 580 can be a microprocessor and a hard disk controller. The drive electronics 550 can also include various interfaces, such as a host-bus interface, and memory devices, such as a read only memory (ROM) for use by a microprocessor, and a random access memory (RAM) for use by a hard disk controller. The hard disk controller can include error correction circuitry.

The HDA 500 and drive electronics 550 can be closed in a sealed container with an integral air filter. For example, the hard disk drive can be assembled using a Winchester assembly. The rotating platter can be driven by a brush-less DC motor, and the rotational frequency can be accurately servo-locked to a crystal reference.

The disk drive can detect SAM and SIM information on the disk(s) 510 as described without knowing the polarity of the readback waveform beforehand. The SAM/SIM can be detected and the readback signal polarity can be determined concurrently, which can be of particular value when the readback signal polarity can change from sector to sector during read operations in the disk drive.

A few embodiments have been described in detail above, and various modifications are possible. Thus, other embodiments may be within the scope of the following claims.

What is claimed is:

1. An apparatus comprising:
   a first detector responsive to a read signal and operable to examine the read signal at alternative framings based on possible signal polarities of the read signal; and
   a second detector responsive to an output of the first detector and operable to find a data pattern that indicates control information in the read signal and to determine a signal polarity of the read signal by comparing signal quality information corresponding to the possible signal polarities of the read signal;
   wherein the first detector is operable to examine the read signal according to a first framing indicated by the read signal and a second framing opposite the first framing.

2. The apparatus of claim 1, wherein the read signal comprises a read signal obtained from a storage medium.

3. The apparatus of claim 2, wherein the data pattern comprises a servo mark.

4. The apparatus of claim 1, wherein the first detector comprises a discrete time sequence detector operable to examine the read signal from an equalized channel according to the first framing indicated by the read signal and the second framing opposite the first framing.

5. The apparatus of claim 4, further comprising framing circuitry operable to generate the first and second framings of the read signal, wherein the discrete time sequence detector comprises first and second Viterbi detectors, the first Viterbi detector operable to examine the read signal according to the first framing, and the second Viterbi detector operable to examine the read signal according to the second framing.

6. The apparatus of claim 4, wherein the second detector performs operations comprising:
   identifying the data pattern in one or both of the first and second framings of the read signal; and
   confirming the data pattern as found and the signal polarity based on the signal quality information from the discrete time sequence detector for the first and second framings.

7. The apparatus of claim 6, wherein the signal quality information for the first and second framings comprises first and second Viterbi path metrics, and the second detector compares one of the first and second Viterbi path metrics with the other one of the first and second Viterbi path metrics to confirm the data pattern as found and the signal polarity.

8. The apparatus of claim 4, wherein the second detector identifies the data pattern subject to a programmable symbol error tolerance setting.

9. An apparatus comprising:
   means for examining a read signal at alternative framings based on possible signal polarities of the read signal; and
   means for finding a data pattern that indicates control information in the read signal and for determining a signal polarity of the read signal by comparing signal quality information from the means for examining, the signal quality information corresponding to the possible signal polarities of the read signal;
   wherein the means for examining comprises means for examining the read signal according to a first framing indicated by the read signal and a second framing opposite the first framing.

10. The apparatus of claim 9, wherein the read signal comprises a read signal obtained from means for storing data.

11. The apparatus of claim 10, wherein the data pattern comprises a servo mark.

12. The apparatus of claim 9, wherein the means for examining comprises discrete-time sequence means for examining the read signal from an equalized channel according to the first framing indicated by the read signal and the second framing opposite the first framing.

13. The apparatus of claim 12, further comprising means for generating the first and second framings of the read signal, wherein the discrete-time sequence means comprises first Viterbi means for examining the read signal according to the first framing and second Viterbi means for examining the read signal according to the second framing.

14. The apparatus of claim 12, wherein the means for finding the data pattern and determining the signal polarity comprising:
   means for identifying the data pattern in one or both of the first and second framings of the read signal; and
   means for confirming the data pattern as found and the signal polarity based on the signal quality information from the discrete-time sequence means for examining the read signal according to the first and second framings.

15. The apparatus of claim 14, wherein the signal quality information for the first and second framings comprises first and second Viterbi path metrics, and the means for confirming comprises means for comparing one of the first and second Viterbi path metrics with the other one of the first and second Viterbi path metrics to confirm the data pattern as found and the signal polarity.

16. The apparatus of claim 12, wherein the means for finding the data pattern and determining the signal polarity comprises means for identifying the data pattern subject to a programmable symbol error tolerance setting.

17. A system comprising:
   a storage medium;
   a head assembly operable to obtain a read signal from the storage medium;
   a first detector responsive to the read signal and operable to examine the read signal at alternative framings based on possible signal polarities of the read signal; and
   a second detector responsive to an output of the first detector and operable to find a data pattern that indicates control information in the read signal and to determine a signal polarity of the read signal by comparing signal quality information corresponding to the possible signal polarities of the read signal;
   wherein the first detector is operable to examine the read signal according to a first framing indicated by the read signal and a second framing opposite the first framing.

18. The system of claim 17, wherein the storage medium comprises a magnetic storage medium.

19. The system of claim 17, wherein the data pattern comprises a servo mark.

20. The system of claim 17, wherein the first detector comprises a discrete time sequence detector operable to examine the read signal from an equalized channel according to the first framing indicated by the read signal and the second framing opposite the first framing.

21. The system of claim 20, further comprising framing circuitry operable to generate the first and second framings of the read signal, wherein the discrete time sequence detector comprises first and second Viterbi detectors, the first Viterbi detector operable to examine the read signal according to the first framing, and the second Viterbi detector operable to examine the read signal according to the second framing.

22. The system of claim 20, wherein the second detector performs operations comprising:
   identifying the data pattern in one or both of the first and second framings of the read signal; and confirming the data pattern as found and the signal polarity based on the signal quality information from the discrete time sequence detector for the first and second framings.

23. The system of claim 22, wherein the signal quality information for the first and second framings comprises first and second Viterbi path metrics, and the second detector compares one of the first and second Viterbi path metrics with the other one of the first and second Viterbi path metrics to confirm the data pattern as found and the signal polarity.

24. The system of claim 20, wherein the second detector identifies the data pattern subject to a programmable symbol error tolerance setting.

25. A system comprising:
means for storing data;
means for obtaining a read signal from the means for storing data;
means for examining the read signal at alternative framings based on possible signal polarities of the read signal; and
means for finding a data pattern that indicates control information in the read signal and for determining a signal polarity of the read signal by comparing signal quality information from the means for examining, the signal quality information corresponding to the possible signal polarities of the read signal;
wherein the means for examining comprises means for examining the read signal according to a first framing indicated by the read signal and a second framing opposite the first framing.

26. The system of claim 25, wherein the means for storing data comprises magnetic means for storing data.

27. The system of claim 25, wherein the data pattern comprises a servo mark.

28. The system of claim 25, wherein the means for examining comprises discrete-time sequence means for examining the read signal from an equalized channel according to the first framing indicated by the read signal and the second framing opposite the first framing.

29. The system of claim 28, further comprising means for generating the first and second framings of the read signal, wherein the discrete-time sequence means comprises first Viterbi means for examining the read signal according to the first framing and second Viterbi means for examining the read signal according to the second framing.

30. The system of claim 28, wherein the means for finding the data pattern and determining the signal polarity comprises:
means for identifying the data pattern in one or both of the first and second framings of the read signal; and
means for confirming the data pattern as found and the signal polarity based on the signal quality information from the discrete-time sequence means for examining the read signal according to the first and second framings.

31. The system of claim 30, wherein the signal quality information for the first and second framings comprises first and second Viterbi path metrics, and the means for confirming comprises means for comparing one of the first and second Viterbi path metrics with the other one of the first and second Viterbi path metrics to confirm the data pattern as found and the signal polarity.

32. The system of claim 28, wherein the means for finding the data pattern and determining the signal polarity comprises means for identifying the data pattern subject to a programmable symbol error tolerance setting.

33. A method comprising:
examining a read signal at alternative framings based on possible signal polarities of the read signal; and
finding a data pattern that indicates control information in the read signal and determining a signal polarity of the read signal by comparing signal quality information corresponding to the possible signal polarities of the read signal;
wherein examining the read signal comprises examining the read signal according to a first framing indicated by the read signal and a second framing opposite the first framing.

34. The method of claim 33, wherein examining the read signal comprises examining a read signal obtained from a magnetic storage medium.

35. The method of claim 34, wherein the data pattern comprises a servo mark.

36. The method of claim 33, wherein examining the read signal comprises examining in discrete time the read signal from an equalized channel according to the first framing indicated by the read signal and the second framing opposite the first framing.

37. The method of claim 36, further comprising generating the first and second framings of the read signal, and wherein examining the read signal comprises examining the read signal according to the first framing in a first Viterbi detector and examining the read signal according to the second framing in a second Viterbi detector.

38. The method of claim 36, wherein finding the data pattern and determining the signal polarity comprises:
identifying the data pattern in one or both of the first and second framings of the read signal; and
confirming the data pattern as found and the signal polarity based on the signal quality information from the examination of the read signal for the first and second framings.

39. The method of claim 38, wherein the signal quality information for the first and second framings comprises first and second Viterbi path metrics, and confirming the data pattern and the signal polarity comprises comparing one of the first and second Viterbi path metrics with the other one of the first and second Viterbi path metrics.

40. The method of claim 36, wherein finding the data pattern and determining the signal polarity comprises identifying the data pattern subject to a programmable symbol error tolerance setting.

41. A computer readable medium encoded with a software program operable to cause one or more machines to perform operations comprising:
examining a read signal at alternative framings based on possible signal polarities of the read signal; and
finding a data pattern that indicates control information in the read signal and determining a signal polarity of the read signal by comparing signal quality information corresponding to the possible signal polarities of the read signal;
wherein examining the read signal comprises examining the read signal according to a first framing indicated by the read signal and a second framing opposite the first framing.

42. The computer readable medium of claim 41, wherein examining the read signal comprises examining a read signal obtained from a magnetic storage medium.

43. The computer readable medium of claim 42, wherein the data pattern comprises a servo mark.

44. The computer readable medium of claim 41, wherein examining the read signal comprises examining in discrete time the read signal from an equalized channel according to the first framing indicated by the read signal and the second framing opposite the first framing.

45. The computer readable medium of claim 44, wherein the operations further comprise generating the first and second framings of the read signal, and wherein examining the read signal comprises examining the read signal according to the first framing in a first Viterbi detector and examining the read signal according to the second framing in a second Viterbi detector.

46. The computer readable medium of claim 44, wherein finding the data pattern and determining the signal polarity comprises:
   identifying the data pattern in one or both of the first and second framings of the read signal; and
   confirming the data pattern as found and the signal polarity based on the signal quality information from the examination of the read signal for the first and second framings.

47. The computer readable medium of claim 46, wherein the signal quality information for the first and second framings comprises first and second Viterbi path metrics, and confirming the data pattern and the signal polarity comprises comparing one of the first and second Viterbi path metrics with the other one of the first and second Viterbi path metrics.

48. The computer readable medium of claim 44, wherein finding the data pattern and determining the signal polarity comprises identifying the data pattern subject to a programmable symbol error tolerance setting.

* * * * *